Dec. 9, 1969  P. P. SOROKIN  3,483,486
MULTIPLE PHOTON LASER
Filed April 10, 1964  2 Sheets-Sheet 1
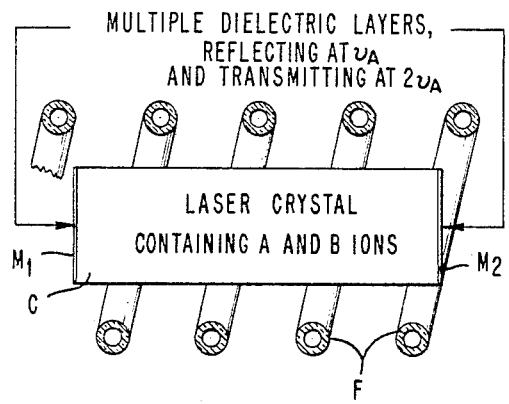
FIG. 1
FIG. 2
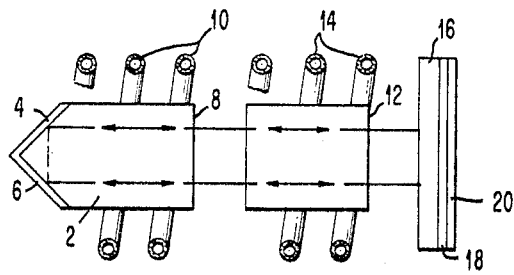
FIG. 5
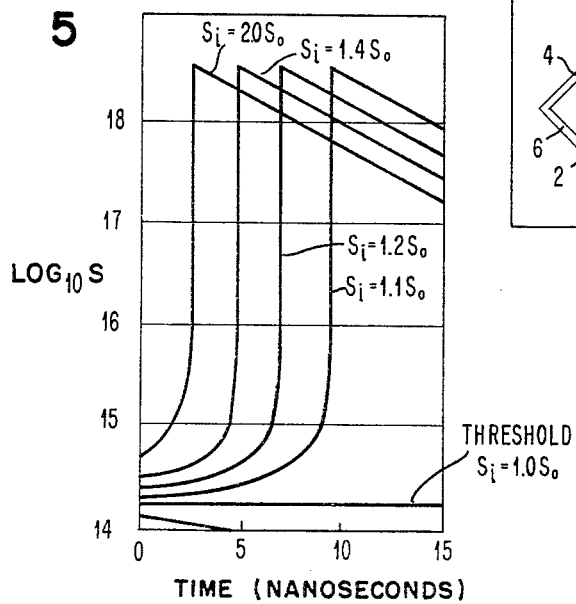
FIG. 6
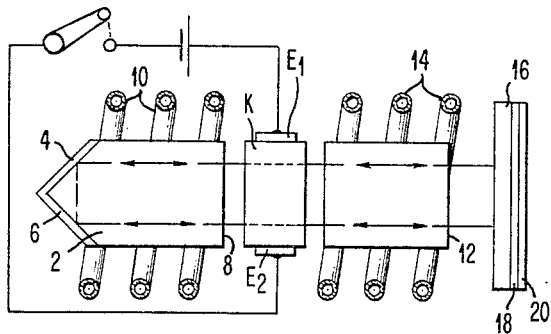
INVENTOR
PETER P. SOROKIN
BY *George Baron*
ATTORNEY

United States Patent Office 3,483,486
Patented Dec. 9, 1969

3,483,486
MULTIPLE PHOTON LASER
Peter P. Sorokin, Ossining, N.Y., assignor to International Business Machines Corporation, New York, N.Y., a corporation of New York
Filed Apr. 10, 1964, Ser. No. 358,733
Int. Cl. H01s 3/18
U.S. Cl. 331—94.5                                11 Claims

ABSTRACT OF THE DISCLOSURE

A system is disclosed for producing laser emission wherein an active ion emits two photons when it suffers a transition in a laser cavity between an excited state and an unexcited state. In normal transitions, $E_m - E_t = h\nu_0$, where $E_m$ is the energy of the excited particle at the excited state $m$ and $E_t$ is the energy of the particle at the unexcited state, $h$ is Planck's constant and $\nu_0$ is the frequency of the photons emitted during such transitions. However, if two species of ions A and B are placed in a laser cavity, both species can be excited to have their respective populations inverted. The inverted population of the B-ions is prevented from lasing by means of a low cavity Q or by a choice of a very long spontaneous lifetime for such B-ions. The cavity has a high Q for the inverted population of A-ions.

The laser housing both ions will be primed with an initial intense light pulse of frequency $$\nu_A = \frac{\nu_B}{2}$$

and will continue to emit strongly at this frequency, emitting two photons for each transition of a B-ion until the population inversion of the B-ions is reduced to zero.

---

This invention relates to lasers, and more particularly to a generator of coherent light in the form of very intense pulses through the phenomenon of stimulated emission of radiation.

Most solid state optical lasers produce outputs that are erratic. The output energy produced by a laser beam will consist normally of many spiked outputs wherein hundreds of such spikes appear spaced on the average by intervals of 1–3 microseconds and the total output "pulse" lasts for an interval of about 500 microseconds. The practitioners in the art of lasers have been attempting to obtain pulsed outputs in the form of coherent light which consists of a single intense spike that is short in duration. Some scheme is required, in obtaining such a giant pulse, that highly excites a laser crystal so that the latter is pumped to a condition of near total population inversion and then such excitation must be efficiently and rapidly dumped as output power in the form of such a single stimulated radiant-emission pulse.

The present invention seeks to obtain this giant pulse by exploiting the concept of "double quantum stimulated emission," hitherto uninvestigated. The analogous process, double quantum stimulated absorption, is set forth in the literature. The following article is representative of the art of double quantum stimulated absorption. Such article is entitled "Two-Photon Excitation in $CaF_2:Eu^{2+}$" by W. Kaiser et al. which appeared on pages 229–231 in the "Physical Review Letters" of Sept. 15, 1961, vol. 7, No. 6.

In general, it is known that in conventional laser operation when an active ion undergoes a transition between two states, for example, from the metastable state $m$ to the ground state $t$, a photon is emitted during such transition whose frequency corresponds to the energy difference between these two states. Such energy difference can be written as $E_m - E_t = h\nu_0$. In double quantum emissive transitions, an active ion emits two photons with frequency $\nu_0$ in going from state $m$ to state $t$, so that $E_m - E_t = 2h\nu_0$. Such a two-photon process takes place only if a high concentration of photons at $\nu_0$ is present in the lasing cavity. Thus, a triggering laser producing a high flux at $\nu_0$ is employed to cause a second laser to fire. For example, in one embodiment of the invention, a "rooftop" neodymium glass laser is placed adjacent and in optical alignment to a ruby laser and a reflecting mirror is placed adjacent the ruby laser as part of the resonating cavity for both lasers. Multiple dielectric reflectors are coated on the reflecting mirror so that the latter is 99% reflective of frequencies generated by the neodymium glass laser and 1% transmissive of the frequencies emitted by the neodymium glass laser. The dielectric coatings are chosen so that they are highly transmissive of the frequencies normally emitted by the ruby laser.

A flash lamp for exciting both lasers surrounds each laser. When the flash lamp is turned on, the respective ion populations of each of the crystals, namely, the neodymium doped glass and the ruby, are inverted. Since the end plate reflectivity is high at the frequency of the neodymium glass laser, the neodymium glass crystal will begin to oscillate at its frequency emitting spikes of light in the manner characteristic of conventional optically pumped solid state lasers. Large photon populations will sporadically be produced in certain modes whose double frequencies are right near the peak frequency of the ions in the ruby laser crystal. However, no stimulated emission involving the inverted ion ruby laser can occur because of the low reflectivity of the reflector adjacent the ruby laser. If the photon density in one of the modes coherently excited by the ions in the neodymium glass laser becomes large enough, the cross-section for a double quantum transition increases in the ruby crystal in which two photons are simultaneously added to the triggering mode of the neodymium glass laser and a chromium ion is de-excited. Since the cross-section continues to increase with the addition of more photons to the lasing mode of the neodymium glass laser, an avalanche effect producing photons of this favored frequency occurs, resulting in a giant pulse at this frequency. This giant pulse will continue until the chromium ion population excess in the ruby crystal is reduced.

Consequently, it is an object of this invention to obtain a laser system employing the principle of double quantum stimulated emission.

It is yet another object to employ the principle of double quantum stimulated emission so as to obtain a coherent light generator.

It is yet another object to employ a giant pulse generator that does not require external auxiliary equipment to obtain the desired single spike intense laser output pulse.

It is yet another object to employ the principle of double quantum stimulated emission so as to obtain a coherent light generator delivering a single spike "giant pulse" output having a rise time considerably faster than that which can be produced by any other known technique.

The foregoing and other objects, features and advantages of the invention will be apparent from the following more particular description of preferred embodiments of the invention as illustrated in the accompanying drawings.

In the drawings:
FIGURE 1 is a schematic showing of a first embodiment of the invention.
FIGURE 2 is a schematic showing of a second embodiment of the invention.
FIGURES 3a and 3b are energy diagrams comparing different species of ions whose populations have been inverted.

FIGURE 5 is a diagram illustrating the time buildup of a giant pulse with respect to the number of photons at any time in the oscillating mode of the double quantum laser.

FIGURE 6 is a modification of the embodiment of the invention shown in FIGURE 2.

Turning to FIGURE 1, there is shown the generalized version of the basic invention. A host crystal C contains two species of ions A and B. The ends of the host crystal C are polished into either plane or hemispherical surfaces so as to produce mirror surfaces $M_1$ and $M_2$. Surrounding the host crystal is a source of pumping energy shown as flash lamp coil F.

The ions A and B that are selected to be carried by the host crystal C bear the following relationship to each other, namely, the frequency of the laser light generated by the A-ions when multiplied by a factor of 2 must fall within the spontaneous emission line width of a B-ion fluorescent transition, one with respect to which an inverted population can be produced by the action of the same surrounding flash lamp coils F that activates the A-ions. The mirrors $M_1$ and $M_2$ are chosen so that they are highly reflecting at the frequency $\nu_A$ but heavily transmitting at frequency $2\nu_A$.

Figure 4:
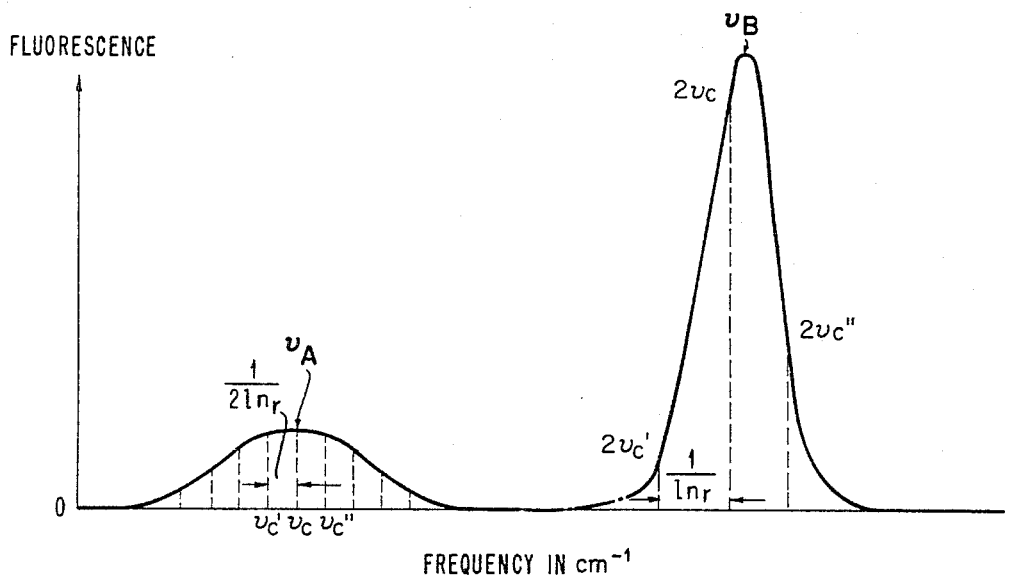
FIGURE 4 is a fluorescence vs. frequency plot of the different species of ions employed to illustrate the operation of the invention.

The giant pulse generator of FIGURE 1 operates in the following manner: Flash lamp F pumps both the A and B-ions within host crystal C, inverting the population of each of the ions. Since mirror $M_2$ is highly reflective at frequency $\nu_A$, the host crystal C will oscillate at this frequency, emitting spikes of light characteristic of most optically pumped solid state lasers. Large photon populations will thus be produced in certain modes having frequencies $\nu_c$, $\nu'_c$, $\nu''_c$, etc., which lie near the peak $\nu_A$ of the A-ion fluorescence as seen in FIGURE 4. It is noted that no stimulated emission involving the inverting B-ion population occurs because of the low reflectivity of mirrors $M_1$ and to the frequency at $2\nu_A$. However, if the photon density in one of the modes coherently excited by the A-ions, such as, frequency $\nu_c$, becomes large enough, the cross-section for a double quantum transition in which a B-ion is de-excited and two photons are simultaneously added to the $\nu_c$ mode increases appreciably. Since the cross-section for this process continues to increase with the addition of more photons to the $\nu_c$ mode, an avalanche effect is produced by such $\nu_c$ photons so that a giant pulse at the frequency $\nu_c$ occurs. This giant pulse continues until the B-ion population excess is largely reduced.

In FIGURE 2, a crystal lasing medium 2 of glass, doped with neodymium, has its left end cut so as to present two total internal reflective surfaces 4 and 6 its right end 8 is uncoated. Surrounding the neodymium glass active medium is a flash lamp 10. To the right of the active medium 2 and in optical alignment therewith is a ruby crystal 12. The ruby crystal is composed of aluminum oxide doped with chromium ions. Surrounding the ruby crystal 12 or active medium is another flash lamp 14. Although two separate flash lamps are shown, the device can be operated by a single flash lamp applying pumping energy to both active media 2 and 12. To the right of the ruby crystal 12 is a mirror 16. Said mirror 16 is coated with a plurality of dielectric films 18 and 20, such films being chosen so that the mirror 16 is, for example, 99% reflective and 1% transmissive to the frequency of light given out by the neodymium doped glass active medium 2 but is highly transmissive to the frequency of light given out by the ruby crystal 12. Aided by the selectivity of the mirror 16, the neodymium doped glass laser emits at approximately 1.38 microns and the ruby laser emits at 0.69 micron. It is to be noted that the active media 2 and 12 were chosen so that the frequency $\nu_B$ of the ruby laser equals twice the frequency $\nu_A$ of the neodymium glass laser.

Figure 3A:
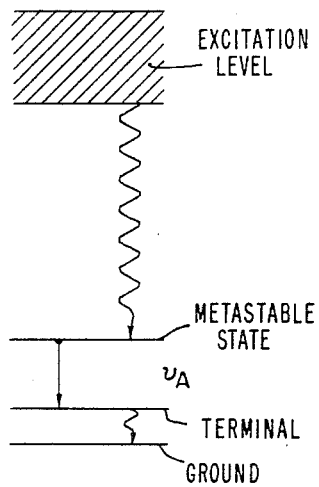
Figure 3B:
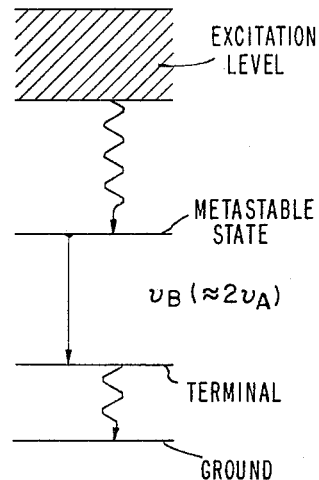

FIGURES 3a, 3b and 4 will be examined in conjunction with the operation of the laser scheme of FIGURE 2 in order to better understand the operation of FIGURE 2. With respect to the neodymium doped glass laser, the flashing of lamp 10 causes neodymium ions to be pumped from the ground state to their excitation level. Pumping to this excitation level is required to obtain the population inversion needed for stimulated emission. The neodymium ions are dropped from the excited level to an intermediate state or metastable level without radiating any light during such transition. The ions, in falling from the metastable state to the terminal state, emit laser light at a frequency $\nu_A$; in falling from the terminal state to the ground state there is no radiation emitted. Since the mirror 16 is highly reflective at the emitted radiation $\nu_A$, the neodymium doped glass laser will oscillate at this frequency, emitting spikes of light characteristic of most optically pumped solid state crystal. The ruby laser 12 will not oscillate because mirror 16 does not reflect such ruby frequency of 0.69 micron. As the neodymium glass laser continues to lase, the chromium ions in the ruby laser have an increasing tendency to undergo double quantum emissive transitions. If the primary flux (i.e., the $Nd^{+3}$ glass laser flux) is high enough, the production rate of $1.38\mu$ photons due to double quantum emissive transitions of the $Cr^{+3}$ ions becomes larger than the rate of loss of these photons from the cavity due to end plate transmission, diffraction losses, scattering, etc., and an avalanche effect will occur, suddenly building up a high population of $1.38\mu$ photons in the cavity mode. In effect, the ruby has initially an inverted population of its chromium ions built up but sees a low reflectively so that its normal (first order) lasing threshold is not reached. The neodymium glass laser meanwhile continues to supply more photons to the primary cavity. Finally, at a high population inversion of the chromium ions in the ruby laser, the latter is triggered into double quantum lasing in the unit process of which two photons simultaneously are added in the oscillating mode of the neodymium glass laser. At this point there is a rapid dumping of energy out of the lasing system of FIGURE 2, leading to the formation of a single high energy pulse.

In FIGURE 6, a Kerr cell K is employed as a Q-switching element in the primary lasing cavity. The Kerr cell K is a well known switch that can cut off or transmit polarized light depending upon whether or not an electric potential is applied across the electrode $E_1$ and $E_2$ of said cell. Once pumping energy is applied to active media 2 and 12, inverted ion populations take place in both media, but the Kerr cell K is turned off. A potential is applied to the cell K so that said cell is transmissive to the lasing light of frequency $\nu_A$. The system of FIGURE 6 then produces the giant pulse as described for the system of FIGURE 2. The Kerr cell K, or similar Q-switcher, gives a boost, or amplifies, in effect, the triggering pulse produced by the lasing medium 2.

Although the operation of a double quantum stimulated emission device is not fully understood, a proposed theory is being submitted as an aid to the understanding of such phenomenon, it being understood that the accuracy or inaccuracy of that theory should not detract from the contribution submitted herein.

The first question to be answered, in determining the operational aspects of the systems described herein, is whether normal "spiking" of the A-ions can produce enough photons in the primary cavity mode $\nu_c$ to "trigger" the double quantum avalanche involving, and energized by, the B-ions. In the literature, the formula for the coefficient expressing the strength of two-photon absorptive processes is the following:

$$\sigma_1 = \frac{r_o^2 c^2 f^2}{n_r^2 \nu_A^2 \Delta\nu} \quad (1)$$

where $n_r$ is the medium refractive index, $r_o$ is the classical electron radius, $c$ is the velocity of light and $\Delta\nu$ is the width of the real, excited state at $2h\nu_A$. It is assumed, in the derivation of Equation 1, that absorption occurs through a single, intermediate, virtual state coupled to both initial and final states by an oscillator strength $f$. Equation 1, while only regarded as approximate, has been shown to apply for the $CaF_2:Eu^{+2}$ data presented in an article by W. Kaiser and C. G. B. Garrett, that appeared in "Physical Review Letters," vol. 7, 1961, page 229 The coefficient $\sigma_1$ appearing in Equation 1 must be multiplied by the incident flux F to get the double quantum cross-section $$\sigma = \sigma_1 F \quad (2)$$

Thus, the decrease in power of a propagating plane wave inducing double quantum absorptive transitions is $$\frac{dP}{dx} = -\left(\frac{N}{V}\right)\sigma_1 \frac{P^2}{h\nu_A A} \quad (3)$$

Here A is the beam area and $(N/V)$ is the density of ions. Formulas 1, 2, and 3 should also apply in the case of stimulated emission with a plus sign replacing the minus sign in Equation 3.

For the double quantum stimulated emission process to "take over," leading to the formation of a giant pulse, the cavity energy gained by this process must exceed that lost by transmission through the end walls. If $\bar{u}_T$ is the average *total* (i.e. both electric and magnetic) energy density in the cavity, the "trigger" condition may be written $$\int_{x=0}^{x=l}\left(\frac{d\bar{u}_T}{dt}\right)_{DQ} dx = \frac{1}{t_c}\int_{x=0}^{x=l}\bar{u}_T dx \quad (4)$$

Here $t_c$ is the cavity decay time given by $$t_c = \frac{n_r l}{c(1-R)} \quad (5)$$

provided it is assumed that the cavity decays via an equal transmission loss $(1-R)$ through each end wall of the cavity. The expression $(d\bar{u}_T/dt)_{DQ}$ represents the rate of increase of average total energy density inside the cavity as a result of the double quantum process. For the case of a propagating plane wave, the following holds true $$P = \frac{A\bar{u}_T c}{n_r} \quad (6)$$

Thus, from Equation 3 one obtains $$\left(\frac{d\bar{u}_T}{dt}\right)_{DQ} = \left(\frac{N^b}{V}\right)\frac{\sigma_1 c^2 \bar{u}_T^2}{h\nu_A n_r^2} \quad (7)$$

Since the electric field is active in a two-photon process, one may rewrite Equation 7 as $$\left(\frac{d\bar{u}_T}{dt}\right)_{DQ} = \frac{1}{2}\left(\frac{N^b}{V}\right)\frac{\sigma_1 c^2 \bar{u}_E^2}{h\nu_A n_r^2} \quad (8)$$

and assume that this last equation holds true generally. Inside the cavity one has $$\bar{u}_E = \tfrac{1}{2} K \cos^2 kx \quad (9)$$

$$\bar{u}_H = \tfrac{1}{2} K \sin^2 kx \quad (10)$$

where K is a constant of proportionality. Making use together of Equations 4, 5, 8, 9 and 10, one finds the following expressions for the peak power emitted out either end of the crystal in the smallest primary "spike" capable of triggering the double quantum avalanche $$P_{spike} = \frac{A\int \bar{u}_T dx}{2t_c} = \frac{(1-R)^2 h\nu_A A^2}{\sigma_1 N^b \langle \cos^4 \rangle} \quad (11)$$

Since $\langle \cos^4 \rangle = 3/8$ $$P_{spike} = \frac{8}{3}\frac{(1-R)^2 h\nu_A A^2}{N^b \sigma_1} \quad (12)$$

Using Equation 1 with $f \approx 1$, $n_r = 1.5$, $\nu_A = 1.5 \times 10^{14}$ c.p.s., and $\Delta\nu$ 1.2 cm.$^{-1}$, one finds $\sigma_1 \approx 3.84 \times 10^{-44}$ cm.$^4$ sec. Using this value of $\sigma_1$ in Equation 12, together with the values $N^b/V \approx 10^{18}$/cc., $l = 4$ cm., $A = 0.5$ cm.$^2$, $(1-R) = 0.05$, one computes a required minimum output power $P_{spike} \approx 2.18$ kw. This peak output power should be attainable with most existing four-level optically pumped lasers. The number of photons $S_0$ in the cavity corresponding to this power is determined by $$\frac{S_0 h\nu_A}{2t_c} = P_{spike} \quad (13)$$

Thus, for the conditions assumed here, $t_c \approx 4 \times 10^{-9}$ sec. and $S_0 \approx 1.74 \times 10^{+14}$ photons.

The triggering requirements are seen to be reasonable, but the necessity of fairly heavy pumping is obvious. Sufficient pumping intensity should be available with the crystal placed within the coils of a commercially available cylindrical flash lamp.

For the parameters considered above, it is possible to show that a giant pulse would, indeed, occur if the primary cavity photon population exceeded $S_0$. A simple set of rate equations describing the kinetics of the process (neglecting spontaneous emission of B-ions and stimulated emission of A-ions) is $$\frac{dS}{dt} = 2B_1 S^2 N^b - \frac{S}{t_c} \quad (14)$$

$$\frac{dN^b}{dt} = -B_1 S^2 N^b \quad (15)$$

S is the number of photons at any time in the $\nu_c$ mode and $N^b$ is the total inversion of B-ions in the crystal at any time. The coefficient $B_1$ appearing in Equations 14 and 15 is related to the quantity $\sigma_1$ appearing in Equation 1 by $$B_1 = \frac{3c^2 \sigma_1}{32 V^2 n_r^2} \quad (16)$$

Let $S_i$ be the initial number of photons placed in the mode at time $t=0$ as a result of stimulated emission from the A-ions. In terms of Equations 14 and 15, the threshold number of photons, $S_0$, is that number which makes $S_{t=0} = 0$. This is found from Equation 14 to be $$S_0 = \frac{1}{2B_1 N_i^b t_c} \quad (17)$$

where $N_i^b$ is the initial B-ion population inversion.

With a choice of parameters satisfying $N_i^b \gg S_i$, one expects the number of inverted B-ions, $N_i^b$, to remain essentially constant until the number of photons S exceeds the threshold value by at least an order of magnitude. Initially, then, Equation 14 can be integrated directly with $N^b$ constant and equal to $N_i^b$. If the initial number of photons is given as a fraction $\eta$ of the threshold number $S_0$, $$S = S_0[1-(1-1/\eta)\exp(t/t_c)]^{-1} \quad (18)$$

For $\eta = 1$, this expression remains finite until the time $$t_G = t_c ln(\eta\eta-1) \quad (19)$$

when it rapidly diverges. One thus expects the number of photons in the cavity to be given by Equation 18 up to about the time $t_G$. At this time, the number of photons will be large enough to affect the B-ion population inversion. The latter will suddenly be rapidly driven to zero with the number of photons increasing to a value approximately $2N_i^b$. Thereafter, the number of photons will decay with the cavity time constant $t_c$.

As shown in FIGURE 5, for $\eta \leq 1$, the number of photons will simply decay to zero. For $\eta > 1$, the number rapidly builds up to the maximum value $2N_i^b$ at a time very close to $t_G$ and then decays with the cavity time constant $t_c$. For the parameter chosen, the spike rises in a time of the order of one nanosecond or faster and decays with a half life of four nanoseconds. The fast rise time is noteworthy and is characteristic of this device.

The invention described above, besides being useful as a means for obtaining a giant or high power output laser pulse, can be employed to produce coherent light in a material that has a very long lifetime metastable state. Normally, in such a material, coherent light cannot be produced by a first order process, such as can be produced with the A-ions in FIGURE 1 or with neodymium as shown in FIGURE 2. However, the teaching of the invention can be employed to extract the energy from such metastable material by a second order process, such as the second order process than extracts the energy from the ruby laser of FIGURE 2 by the lasing action of the neodymium-doped glass laser. To generalize, N, the inverted population of ions, can be represented by the relationship $N_2 - N_1 > K\tau$ where K is a constant, $N_2$ is the number of ions in the excited state and $N_1$ is the number of ions in the ground state, and $\tau$ is the lifetime of the ions in the inverted state. If $\tau$ is very long, then N becomes very large, and reaches a value that is much larger than the number of B-ions that can exist in the metastable device or system. But the present invention permits such B-ions to go into simulated emission by a second order process. That is, from Equation 11, a spiked output $$P = \frac{S_0 h \nu_A}{2t_c} > \frac{(1-R)^2 h \nu_A{}^A}{\sigma_1 N^B \langle \cos^4 \rangle}$$

$S_0$ is the number of triggering photons in the primary mode $\nu_c$ and $N^B$ is the inverted population of the B-ions. When $S_0$ can be made to be much less than $N^B$, the inverted population of the B-ions can be built up so that an increase in $S_0$ can cause a triggering action to take place which will stimulate the B-ions into emission. Thus, the B-ions have been triggered into stimulated emission by a first order lasing process, wherein the frequency of the coherent light of the trigger flux equals the frequency of the coherent light to be extracted by a second order process.

It is to be understood that the principles underlying the present invention can be carried out using solid state or gas lasers. The type of laser used is not significant so long as the cross-section $\sigma_1$ for multiple quantum stimulated emission of B-ions is large enough so that the lasting produced by the A-ions is intense enough to trigger a self-sustaining avalanche production of photons at frequency $$\nu_A \approx \frac{\nu_B}{2}$$

energized by the B-ions. When such conditions prevail, a very fast rise time output pulse (see FIGURE 5) is obtained. Such very fast rise times are exceedingly important, particularly where the pulse is to be amplified in a non-linear manner, in which only the leading edge of the pulse is highly intensified.

While the invention has been particularly shown and described with reference to preferred embodiments thereof, it will be understood by those skilled in the art that various changes in form and details may be made therein without departing from the spirit and scope of the invention.

What is claimed is:

1. An optical laser comprising a resonant cavity formed by a host medium having two end surfaces and a reflecting element at each end surface, said reflecting elements being highly reflective of a first laser frequency and highly transmissive of a second laser frequency, two groups of ions incorporated in said host medium, means for applying pumping energy to said host medium to invert the respective populations of said two groups of ions so as to produce lasing light of said first frequency due to stimulated emission of a first group of ions, said first frequency being one-half the frequency of the laser light normally producible by stimulated emission of said second group of ions.

2. An optical laser comprising a resonant cavity formed by a host medium having two end surfaces and a reflecting element at each end surface, two groups of ions incorporated in said host medium, means for applying pumping energy to said host medium to invert the respective populations of said two groups of ions so as to produce lasing light of a first frequency due to stimulated emission of a first group of ions which triggers the production of much more intense lasing light at the same frequency due to multiple quantum stimulated emission of said second group of ions, the second group of ions having a frequency of transition that is twice that of the first frequency, one said reflecting element being highly reflective of but slightly transmissive to such first frequency, but highly transmissive to said second frequency that is twice said first frequency.

3. An optical laser comprising a resonant cavity formed by a host medium having two end surfaces and a reflecting element at each end surface, said reflecting elements being highly reflective of a first frequency and highly transmissive of a subharmonic frequency of said first frequency, two groups of ions incorporated in said host medium, means for applying pumping energy to said host medium so as to invert the respective populations of said two groups of ions and produce lasing light of said first frequency due to stimulated emission of a first group of ions, said first frequency being a subharmonic of the frequency of the laser light normally producible by stimulated emission of said second group of ions by said same pumping energy means, the lasing in said cavity at said subharmonic frequency producing photons in the lasing cavity that are considerably less than the inverted population of the second group of ions but sufficient to stimulate said second group of ions into double quantum emission.

4. An optical laser comprising a resonant cavity formed by a first active medium and a second active medium, two reflectors bounding said media such that light reflections by said reflectors are sent back through said media, said first active media containing a first group of ions incorporated therein and the second active media containing a second group of ions incorporated therein, means for applying pumping energy to said active media to invert their respective ion populations, said first active medium producing lasing light at a subharmonic frequency of the lasing light normally producible by said second active medium, and one of said light reflectors being highly reflective of and slightly transmissive to the subharmonic frequency, but highly transmissive to said harmonic frequency.

5. An optical laser comprising a resonant cavity formed by a first active medium comprising glass doped with neodymium +3 ions in optical alignment with a second active medium comprising a ruby laser doped with chromium ions, two reflectors bounding said media such that light reflections by said reflectors are sent back through said media, means for applying pumping energy to said active media so as to invert their respective ion populations, said first active medium producing lasing light at a frequency of approximately $1.38\mu$ but said second active medium normally producing lasing light at a frequency of approximately $0.69\mu$, and one of said light reflectors being highly reflective of and slightly transmissive to the $1.38\mu$ frequency, but highly transmissive to said $0.69\mu$ frequency.

6. The optical laser of claim 5 including a Q-spoiling device located in the resonant cavity, said Q-spoiling device serving to intensify the flux produced by said first active medium, whereby the threshold for double quantum stimulated emission is reached.

7. The optical laser of claim 6 wherein said Q-spoiling device is a Kerr cell.

8. An optical laser comprising a resonant cavity formed by a host medium having two end surfaces and a reflecting element at each end surface, said reflective elements being highly reflective of a first frequency and highly transmissive of a second frequency that is a harmonic of said first frequency, two groups of ions incorporated in said host medium, means for applying pumping energy to said host medium to invert the respective populations of said two groups of ions so as to produce a lasing light of said first frequency due to stimulated emission of a first group of ions, the cross-section for multiple quantum stimulated emission of the second group of ions being large enough so that the lasing produced by the first group of ions is sufficiently intense to trigger a self-sustaining avalanche production of photons energized by the second group of ions, said produced photons having a frequency that is approximately one-half the frequency of said second group of ions.

9. A laser device comprising a laser active medium containing at least two groups of particles capable of entering into two excited states from which de-excitation of one of those states occurs as a double quantum transition,
   means for exciting both of said groups of said particles, and
   resonant cavity means optically coupled to said laser active medium reflective at a frequency characteristic of one of said two groups of particles and reflection-free at twice such frequency.

10. A laser device comprising a laser active medium containing two groups of particles, one of which is capable of entering an excited state from which de-excitation occurs as a multiple photon transition,
   means for exciting both groups of particles, and
   resonant cavity means optically coupled to said laser active medium reflective at a first frequency characteristic of one group of particles and reflection-free at twice said first frequency characteristic of said second group of particles.

11. A laser device including:
   an exciting source and a laser active medium optically coupled to said source capable of producing at least a two photon transition and at least first and second different stimulated components, one of which has a first frequency of transition that is twice the frequency of transition of the other characterized by surfaces optically coupled to said laser active medium, one of which is reflective at the first frequency but reflection-free at twice said first frequency, said surfaces forming a resonant cavity for said laser.

No references cited.

JEWELL H. PEDERSEN, Primary Examiner
W. L. SIKES, Assistant Examiner